June 2, 1970 C. D. GAY 3,515,811

MARKING CIRCUIT FOR A RELAY CROSSPOINT NETWORK

Filed Jan. 18, 1968 4 Sheets-Sheet 1

INVENTOR.
CHARLES D. GAY

BY

ATTY.

June 2, 1970 C. D. GAY 3,515,811

MARKING CIRCUIT FOR A RELAY CROSSPOINT NETWORK

Filed Jan. 18, 1968 4 Sheets-Sheet 4

United States Patent Office 3,515,811
Patented June 2, 1970

3,515,811

MARKING CIRCUIT FOR A RELAY CROSSPOINT NETWORK

Charles D. Gay, Chicago, Ill., assignor to Automatic Electric Laboratories, Inc., Northlake, Ill., a corporation of Delaware Filed Jan. 18, 1968, Ser. No. 698,959
Int. Cl. H04q 3/00
U.S. Cl. 179—18 8 Claims

ABSTRACT OF THE DISCLOSURE

A marking circuit for a relay crosspoint switching system employing a two winding relay for each crosspoint wherein an inlet-select circuit common to all matrices in a stage applies a marking potential of one polarity to one inlet in each matrix, a matrix select circuit applies a marking potential of opposite polarity in the form of pulses to all outlets of a selected matrix, and a select-outlet circuit applies a marking potential also of said opposite polarity in the form of pulses to one outlet in each matrix. The pulses supplied by a select-outlet circuit being inverse to those pulses supplied by a matrix select circuit, only one relay in a stage is supplied with both pulses, and only that relay operates.

BACKGROUND OF THE INVENTION

Field of the invention

This invention relates to electronic means for marking inductive crosspoints of a crosspoint switching network in a communication switching system.

Description of the prior art

There are many known communication switching systems using switching networks comprising co-ordinate matrices in a plurality of stages, with links interconnecting adjacent stages, and having a relay with associateed contacts for each co-ordinate intersection of each matrix. Examples of such crosspoint relay type systems are disclosed in U.S. Pats. 3,170,041 by K. K. Spellnes, and 3,349,178 by J. G. Van Bosse. In both of these systems each crosspoint relay has an operate winding and a hold winding. The hold windings are each in series with a set of contacts at the same crosspoint, and are connected in series to the successive stages. The operate windings are each in series with a diode at the same crosspoint and are also connected in series through the successive stages. Before a connection is made through a relay crosspoint switching network, the desired path has to be marked. The marking operation is the selection of the crosspoints in the network that are to be operated in order to make this connection. A path through the network is marked by selecting the one crosspoint in each stage that is to be operated. This crosspoint is determined by its inlet, its common outlet and the matrix in which it is located. In the above and other similar systems the marking is performed by a common control using relays or reed contacts to extend a marking potential to the selected path.

While the marking of a selected path by using relays or reed contacts for extending a marking potential is very reliable and relatively fast, it is desirable to perform the marking function at electronic speeds. However, heretofore, the amount of equipment necessary to perform this marking function at electronic speeds was too expensive to be economically feasible.

SUMMARY OF THE INVENTION

It is an object of this invention to provide a marking arrangement for a crosspoint switching system which can be operated at electronic speeds.

Another object of the invention is to reduce the amount of equipment necessary to mark a crosspoint switching system.

The invention is embodied in a crosspoint switching system having a plurality of co-ordinate matrices, each including a plurality of inlet or horizontal multiples and a plurality of outlet or vertical multiples, and a plurality of relays each having an operate winding and a diode connected in series between a horizontal and a vertical multiple defining a cross-point. The establishment of a connection between a given inlet and a particular outlet is accomplished by operation of a particular crosspoint relay. According to the invention, an inlet-select circuit common to all matrices in a stage uses a transistor to apply a marking potential of one polarity to one inlet in each matrix. A matrix-select circuit also uses a transistor to apply a marking potential of opposite polarity in the form of pulses with a fifty percent duty cycle to all outlet multiples of a selected martix. The pulses are generated by alternatively turning the matrix-select transistor ON and OFF. However, the current flow during the time that the matrix-select transistor is turned ON is insufficient to energize the relay. To select an outlet, the select-outlet circuit, which also includes a transistor which is turned ON and OFF alternately, applies a marking potential, also of an opposite polarity, to one outlet in each matrix. The pulses supplied by the select-outlet transistor also have a fifty percent duty cycle and occur at alternate time periods relative to the pulses supplied by the matrix-select transistor. With this arrangement a train of pulses having a fifty percent duty cycle is applied to many crosspoint relays in a stage, but only one crosspoint relay is supplied with both pulses. Since the pulse train from the outlet-select transistor is interlaced with the pulse train of the matrix-select transistor, the coil conducts current one hundred percent of the time, half of the time through the transistor in the matrix-select circuit and half of the time through the transistor in the select-common-outlet circuit. The current flow in the selected crosspoint builds up to a steady state value and the selected relay operates.

The invention and its features and advantages will be more fully understood from the following detailed description when considered with the accompanying drawings, in which.

DESCRIPTION OF THE PREFERRED EMBODIMENT

The marking circut of the present invention has been designed for incorporation by way of an example, into a common control communication switching system employing a switching network of the type disclosed in the aforementioned K. K. Spellnes and J. G. Van Bosse patents. Systems of this type normally are provided with two or more switching stages arranged to facilitate a given subscriber or inlet to access any one of the terminations or outlets.

Figure 3:
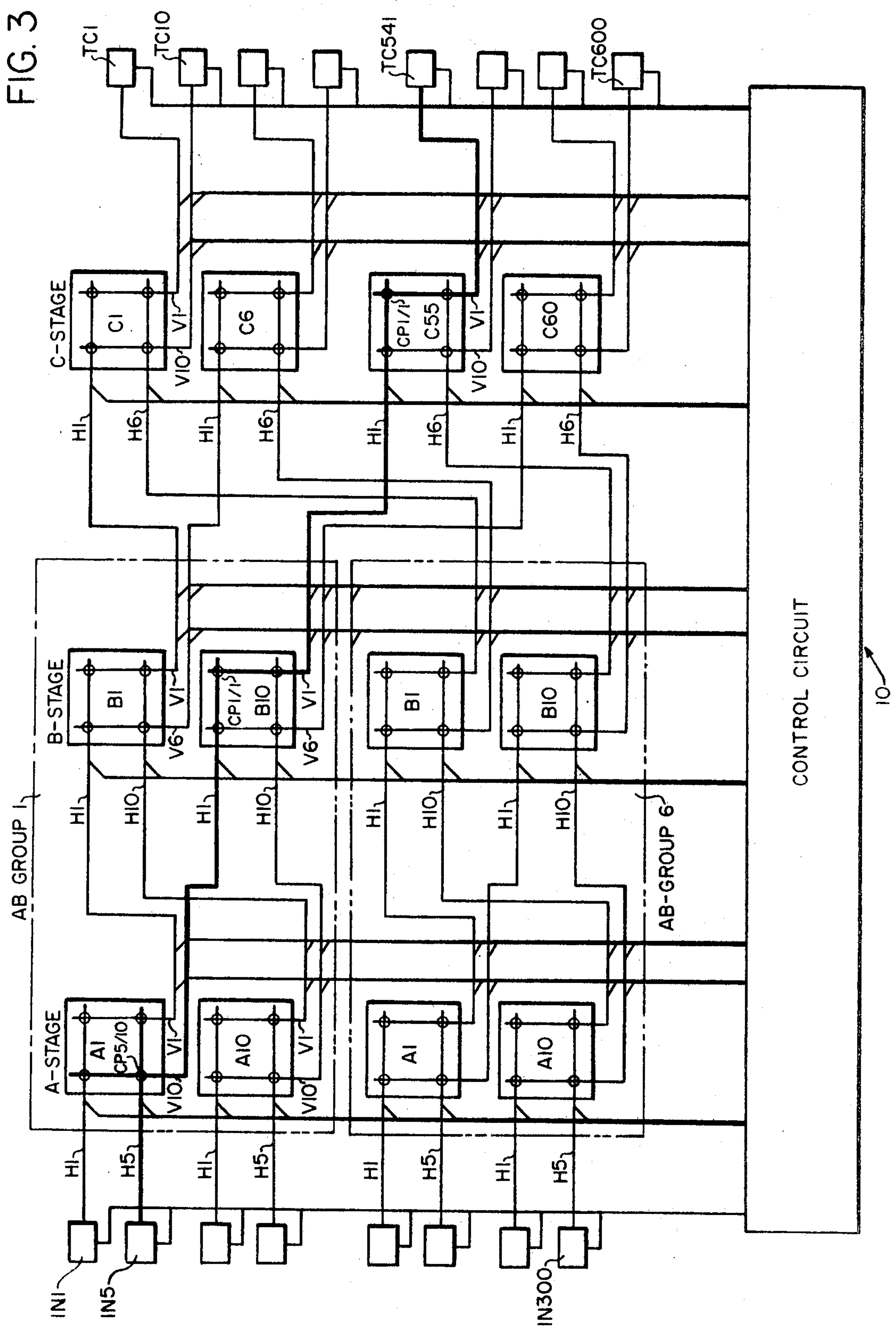
FIG. 3 is a diagrammatic representation of a switching unit having three stages of co-ordinate relay switching.

FIG. 3 of the drawings shows a portion of the switching unit comprising three stages of crosspoint switches and a common control circuit. The first, or A stage contains sixty cards (of which only four are shown) of fifty crosspoints each, arranged in a 5 x 10 matrix to provide 300 inputs each associated with a respective inlet circuit, and 600 outlets or links appearing as inlets to the second or B, stage. The B stage contains sixty cards of sixty crosspoints each, in a 10 x 6 matrix having 360 outlets or links appearing as inlets to the third, or C, stage. The C stage contains sixty cards of sixty cross-points each, in a 6 x 10 matrix with 600 outlets connected to the respective terminating circuits. The switching stages are arranged in such a manner that each inlet circuit is associated with ten AB links and sixty BC links to provide sixty possible paths for at random connections from any inlet circuit to any outlet circuit.

A control circuit 10 has control of all crosspoints in the switching unit and sets up calls on a one-at-a-time basis. The control circuit 10 recognizes a call for service signal, and from the information received designatnig the destination of the call, determines the possible path available before pulling the proper group of crosspoints in establishing a connection between the calling inlet circuit and the idle terminating circuit.

In describing the action of the control circuit in establishing such a communication path in accordance with the invention, it will be assumed that the path is to be established between the inlet circuit IN5 and the terminating circuit TC541. Inlet circuit IN5 is connected to the horizontal multiple of matrix card A1 of the A stage and the terminating circuit is connected to the vertical multiple of matrix card C55 in the C stage. The path to be established therefore has to include the AB link, the B10 matrix card and the BC link, which provides the access between these two stages. The establishment of the required path involves the operation of relays for crosspoints CP5/10 in matrix card A1, CP1/1 in matrix card B10, and CP1/1 in matrix card C55.

Figure 4:
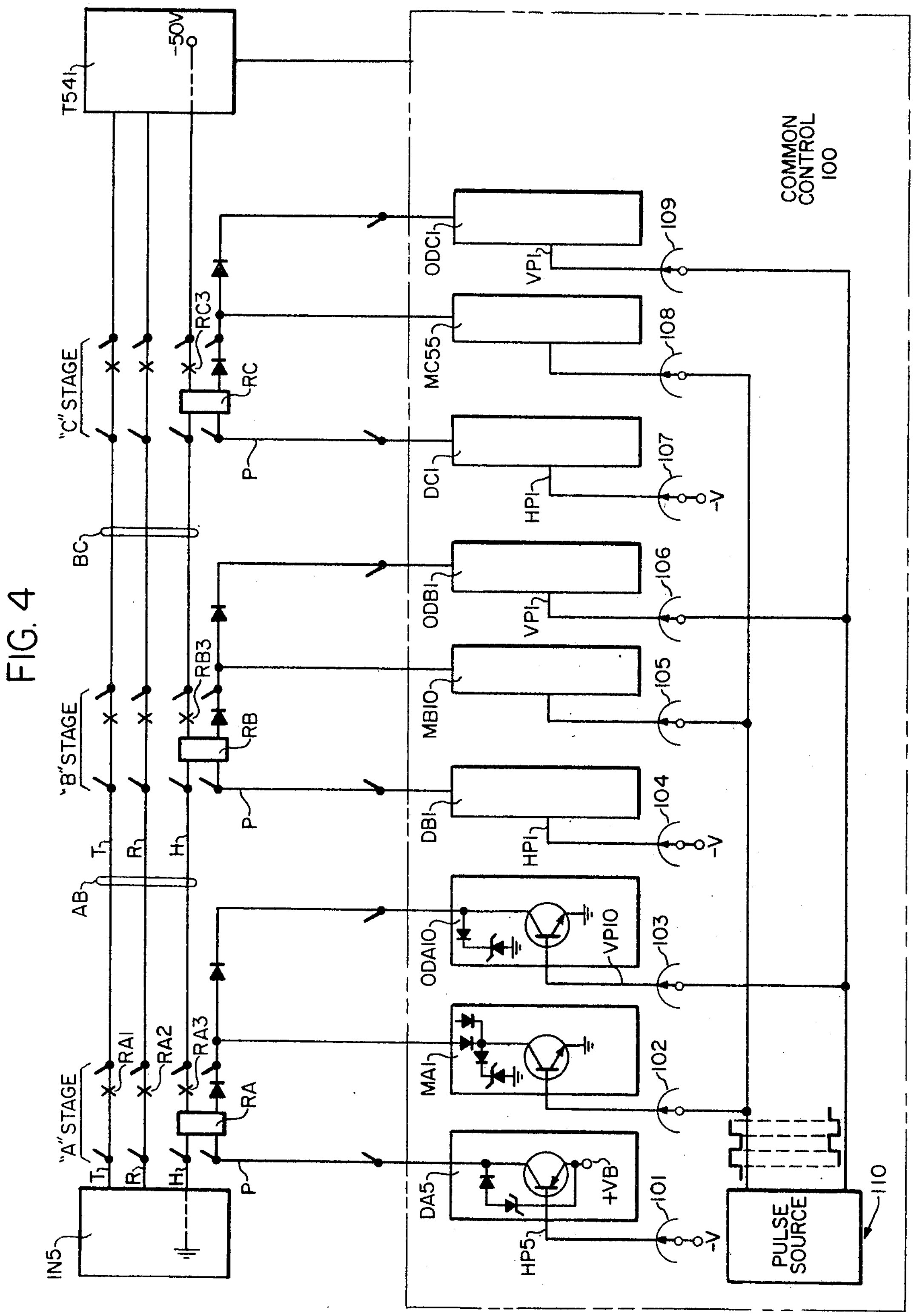
FIG. 4 is a schematic circuit diagram showing one crosspoint in each of the three stages illustrating how a particular communication path through the stages is established.

These crosspoints and the required paths have been extracted and shown in more detail in FIG. 4. The assumed path includes four physical connections, namely the T and R conductors (the talking path connections), the H conductor, and the pull conductors. Each crosspoint relay such as relay RA for CP5/10 in matrix card A10, has three contact pairs RA1, RA2 and RA3 by which these connections can be extended through the crosspoint upon operation of the relay. The crosspont relay also has a hold winding connected in series with its contact RA3 between the H conductors included in the horizontal and vertical multiples defining the crosspoint, and a pull winding in series with an associated diode between the P conductors. As shown in FIG. 3, there can thus be established, by operation of relays RA, RB and RC a hold connection H extending from the conductor H of the inlet circuit IN5 over the H conductor of horizontal multiple H5 of matrix card A10, the winding of relay RA, contacts RA3, the vertical multiple over matrix A10, link AB, the horizontal multiple H1 of matrix B10, the winding of relay RB, contact RB3, the vertical multiple of matrix B10, link BC, the horizontal multiple H1 of matrix C55, the winding of relay RC, contacts RC3, and the vertical multiple of matrix C55 to the terminating circuit TC541. A holding potential extending from the inlet circuit IN5 to the terminating circuit TC541 becomes effective only after closure of contacts RA3, RB3, and RC3.

Figure 1:
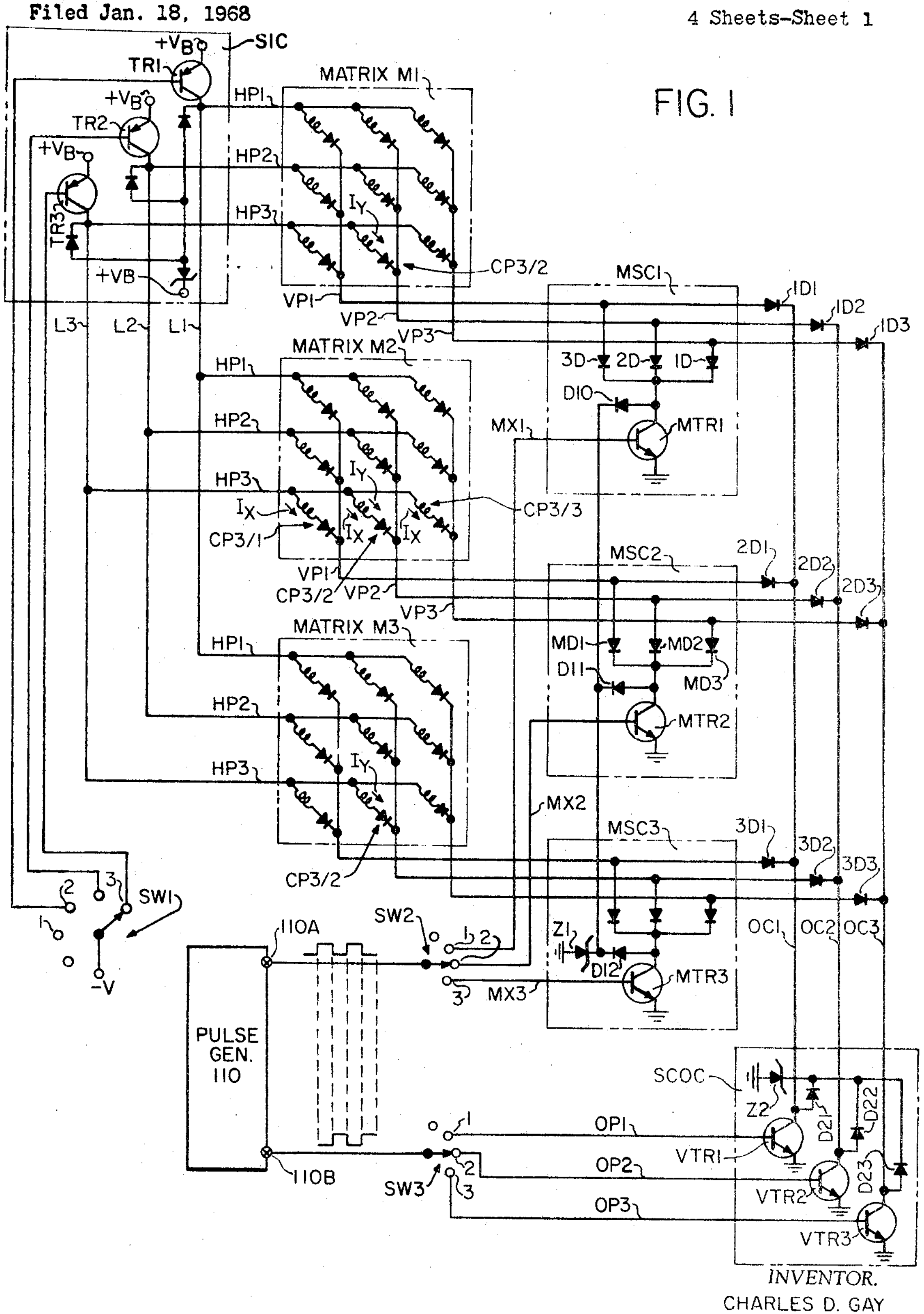
FIG. 1 is a schematic circuit diagram showing a single stage crosspoint network.

The selection and the marking of particular crosspoints through the switching network will now be described with reference to FIG. 1. To facilitate an understanding of the principles of the invention, FIG. 1 shows only a single stage network containing three matrices M1, M2 and M3, each arranged in a 3 x 3 array. Each crosspoint is represented by a pull or marking winding, having an associated diode. The hold winding and the contacts for the path connections are not shown since they do not constitute part of the invention. The horizontal pull lead multiples are connected through the three common leads L1, L2 and L3 for all matrices. Each common lead is associated with and connected to one horizontal multiple in each matrix; i.e., lead L1 is connected to horizontal multiples HP1 of each of the matrices M1, M2 and M3 and correspondingly lead L2 is connected to the horizontal multiples HP2 of all matrices, and lead L3 is connected to the horizontal multiples HP3 of all matrices. Each common lead L1, L2 and L3 is connected to and controlled by an individual one of transistors TR1, TR2 and TR3 in the inlet-select circuit SIC. The collector electrodes of transistors TR1, TR2 and TR3, each having a diode collector clamping circuit including a common Zener diode connected to a positive potential $+V_B$ for the protection of these transistors, are connected to the common leads L1, L2 and L3, respectively, and their emitters are connected to a source of positive potential $+V_B$. The base of each of these transistors is individually connected to the respective terminals of the selector, shown in the drawing as switch SW1, for extending a potential to the base of the selected transistor to thereby turn that transistor ON.

Each matrix is also provided with a matrix-select circuit, such as circuit MSC1 for matrix M1, consisting of one transistor MTR1 having its collector connected to each vertical pull lead VP1, VP2 and VP3 via an associated blocking diode 1D, 2D and 3D, respectively, and its emitter connected to ground. The collector of transistor MTR1 is also clamped via diode D10 and Zener diode Z1 to ground. The base of transistor MTR1 is connected to the terminal 1 of a selector, shown in the drawing as switch SW2, and similarly the bases of transistors MTR2 and MTR3 of matrix-select circuits MSC2 and MSC3 are connected respectively to terminals 2 and 3 of switch SW2.

The vertical pull lead multiples are also connected via individual blocking diodes to the outlet common leads OC1, OC2 and OC3. Each outlet common lead is associated with and connected to one vertical multiple in each matrix; e.g., lead OC1 is connected to vertical multiple VP1 of each of the matrices M1, M2 and M3 via blocking diodes 1D1, 2D1 and 3D1 respectively, and correspondingly lead OC2 is connected via respective diodes 1D2, 2D2 and 3D2 to the vertical multiple VP2 of all matrices. Each outlet common lead OC1, OC2, and OC3 is connected to and controlled by a respective individual transistor VTR1, VTR2 and VTR3 in the select-common outlet circuit SCOC. The collectors of transistors VTR1, VTR2 and VTR3 are respectively connected to the outlet common leads OC1, OC2 and OC3 and via clamping diodes D21, D22 and D23 and a common Zener diode Z2 to ground, and their emitters are connected to ground. The bases of these transistors are individually connected to respective terminals of the selector, shown on the drawings as switch SW3. The armatures or wipers of switches SW2 and SW3 are connected to pulse generator 110 with the wiper of switch SW2 connected to the output terminals 110A and the wiper of switch SW3 connected to the output terminal 110B. The pulse generator 110 provides a train of pulses with a fifth percent duty cycle at output terminal 110A and a train of pulses with a fifty percent duty cycle at output terminals 110B; however, the pulses at the terminal 110B occur at alternate time periods relative to the pulses appearing at the output terminal 110A.

To explain the selection and operation of the required crosspoint, it will be assumed that crosspoint CP3/2 of matrix M2 is to be operated. First, the wiper of switch SW1 is positioned on terminal 3 extending a potential $-V$ to the base of transistor TR3. Transistor TR3 is turned ON, extending a positive voltage $+V_B$ via common lead L3 to horizontal multiples HP3 of matrices M1, M2 and M3. To select a matrix, the wiper of switch SW2 is positioned on terminal 2 extending the train of pulses from the output terminal 110A via lead MX2 to the base of transistor MTR2 of the matrix-select circuit MSC2. Transistor MTR2 is therefore turned ON when an operate pulse is present and turned OFF when the pulse is removed. When the transistor MTR2 is turned ON current is supplied to crosspoints CP3/1, CP3/2 and CP3/3. However, the time that the transistor MTR2 is turned ON is sufficiently short that the current flowing to these cross-points is much smaller than the current necessary to operate the relay contacts associated with these crosspoints. When the transistor MTR2 is turned OF the energy stored in the relay coils is discharged through the Zener diode Z1 via series connected diode D11 clamping the collector of transistor MTR2. It has been determined that if the Zener voltage is equal to or greater than $2V_B$ the current through the crosspoints CP3/1, CP3/2 and CP3/3 returns to practically zero before the next pulse turns transistor MTR2 ON. Therefore, although the transistor MTR2 is switching current through each relay, its amplitude varies between zero and some small value insufficient to operate the relays in crosspoints CP3/1, CP3/2 and CP3/3.

Since crosspoint CP3/2 of matrix M2 is associated with the vertical multiple lead VP2, which is connected via a diode 2D2 to the common lead OC2, it is under the control of transistor VTR2 of the select common outlet circuit SCOC. By positioning the wiper of switch SW3 on its terminal 2, the base of transistor VTR2 is supplied with a train of pulses from the output terminal 110B. The pulses of the train applied to transistor VTR2 are interlaced with the pulses applied to transistor MTR2 of the matrix select circuit MXC2. Thus when the transistor MTR2 is turned ON the transistor VTR2 is turned OFF, and when the transistor VTR2 is turned ON the the transistor MTR2 is turned OFF. When the transistor VTR2 is turned ON, a current is switched through the relay windings of crosspoints CP3/2 of matrices M1, M2 and M3. However, the time that the transistor VTR2 is turned ON is sufficiently short that the current flowing through these crosspoints is much smaller than the current necessary to operate the relay contacts associated with those crosspoints. When transistor VTR2 is turned OFF the energy stored in the relay coils is discharged through the Zener diode Z2 via series-connected diode D22, clamping the collector of transistor VTR2 and the current build up in crosspoints CP3/2 of matrix M1, M2 and M3 returns to zero before the next pulse turns the transistor VTR2 ON.

When transistor TR3 is turned ON, the transistors MTR2 and VTR2 are supplied with trains of pulses, current $I_X$ is switched by transistor MTR2 through coils CP3/1, CP3/2 and CP3/3, and the current $I_Y$ is switched through the coils CP3/2 of matrices M1, M2 and M3. Thus, upon turning on the above three transistors only one crosspoint in the stage has current $I_X$ and current $I_Y$ flowing through one coil; namely, through crosspoint CP3/2 of matrix M2. Since the pulses applied to transistor VTR2 occur at alternate time periods relative to the pulses applied to transistor MTR2, the coil at crosspoint CP3/2 conducts current 100 percent of the time, half of the time through transistor MTR2 and half of the time through transistor VTR2. The current $I_{XY}$ builds up to its steady state value necessary to close the contacts of that relay, and the relay at crosspoint CP3/2 operates.

It should be noted that the duration of the ON pulses supplied to the matrix select transistors and the select outlet transistors should be such that the single pulse train is insufficient to operate any crosspoint relay. The time duration of each pulse and the sequence of switching of the transistors ON and OFF will depend mainly on the type of relay used for a crosspoint.

According to the above described method, operation of the crosspoint relay corresponding to the operating characteristics for the same relay in a direct current circuit. For example, if the relay operates on 12 volts, at 36 milliamperes in 400 microseconds and the pulses are of 25 microseconds duration each, that particular relay will be operated after sixteen pulses; that is, eight pulses from one train of pulses and eight pulses from the other train of pulses.

Figures 2A, 2B, 2C, 2D:
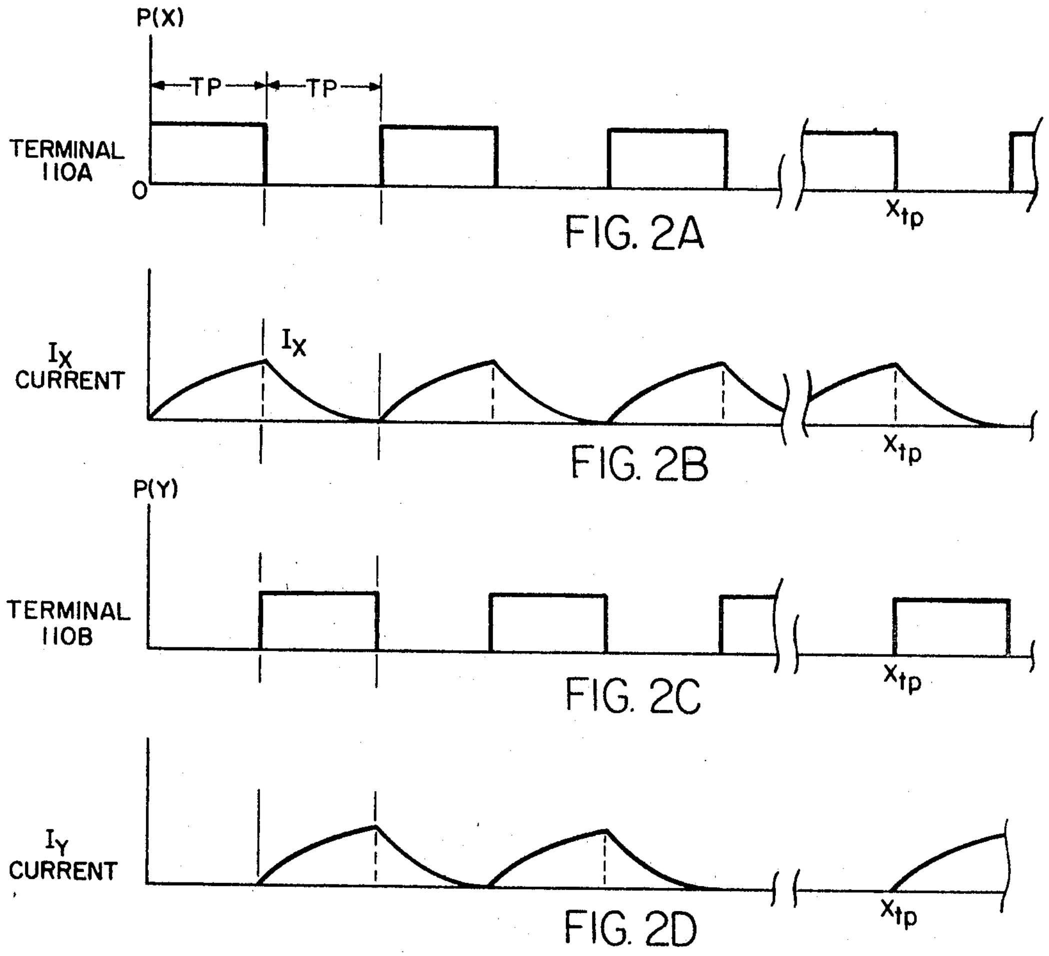
FIGS. 2A–2E show plots of the pulse and current wave forms at various points in the circuit of FIG. 1.
Figure 2E:
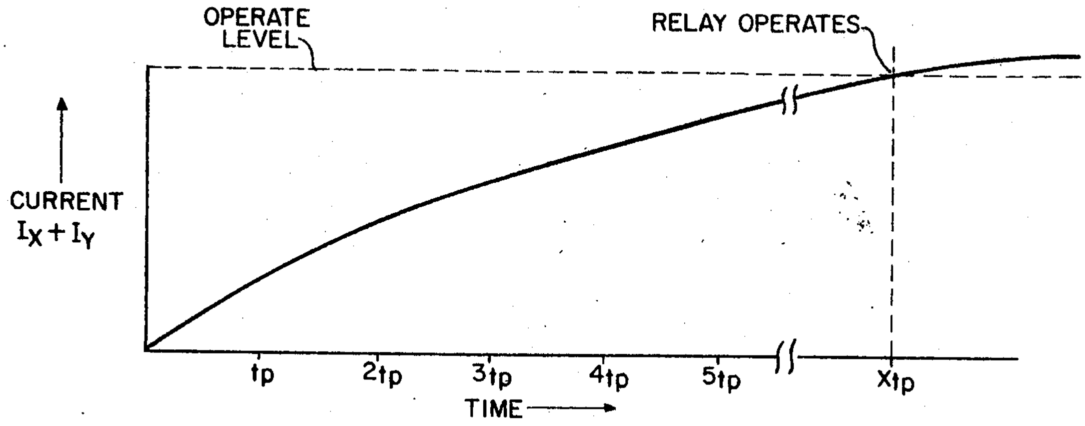

FIGS. 2A, 2B, 2C, 2D and 2E show plots of pulse and current wave forms at various points in the circuit of FIG. 1, associated with energizing the relay at crosspoint CP3/2 of matrix M2. FIG. 2A is the pulse wave form of the input pulse to the base of transistor MTR2. FIG. 2B is the wave form of the current $I_X$, showing the build up and decay form of the current through crosspoints CP3/1, CP3/2 and CP3/3 as the transistor MTR2 is turned ON and OFF in response to the pulse shown in FIG. 2A. FIG. 2C shows the pulse wave form of the input pulse to the base of transistor VTR2. FIG. 2D is the wave form of current $I_Y$, showing the build up and decay characteristic of the current through crosspoint CP3/2 of matrices M1, M2 and M3 as the transistor VTR2 is turned ON and OFF in response to the pulse shown in FIG. 2C. The current wave form through crosspoint CP3/3 comprising both currents $I_X$ and $I_Y$ is shown in FIG. 2E.

Although three, 3 x 3 matrices are referred to and shown in FIG. 1, it will be evident from the foregoing that regardless of how many matrices there are in a stage, or regardless of the arrangement of crosspoints in a single matrix, the method described above can be utilized. The changes involved will be only governed by the number of horizontal multiples to each matrix so that if there are more than three horizontal multiples as shown in FIG. 1, for each additional multiple select inlet circuit SIC is provided with an additional transistor and a common lead to that multiple. Likewise, for each additional vertical multiple a transistor is provided in the select common outlet circuit. If there are more vertical multiples, additional diodes are multiplied to the matrix select circuit transistor. Matrix select circuits are provided in accordance with the number of matrix crosspoint cards in a particular stage.

In the following description of the operation of this invention in a complete network, the transistors and their associated circuits will be called drivers; i.e., the transistors in the select-inlet circuit will be referred to as inlet drivers, in the matrix-select circuit as matrix drivers, and in the select-outlet circuit as outlet drivers.

Returning now to FIGS. 2 and 3, the establishment of a communication path through a three-stage network according to the invention, will now be described. In the previously described A stage containing sixty cards each having five horizontal or inlet multiples and ten vertical or outlet multiples, the select inlet circuit would require five inlet drivers, one for each horizontal multiple which are common to respective inlets of each card, sixty matrix drivers would be needed, and the select common outlet circuit would contain ten outlet drivers, one for each vertical multiple which is common to a respective outlet of each card. The B stage has sixty cards each card having ten horizontal multiples and sixty vertical multiples. The B stage therefore, would be provided with a select inlet circuit containing ten inlet drivers, sixty matrix drivers, and a select common outlet circuit containing six outlet drivers. The C stage also has sixty matrix cards arranged in an array of six horizontal multiples and ten vertical multiples. The C stage therefore would be provided with a select inlet circuit having six inlet drivers, sixty matrix drivers, and a select common outlet circuit having ten outlet drivers. Assume that the inlet circuit IN5 is requesting service and the control circuit determines, by means not shown, that the path to be established is between inlet circuit IN5 and a terminating circuit TC541. The control circuit, also in a manner not shown, determines the matrix cards to be used in each stage and the crosspoints to be used in each card to successfully complete the communication path. The marking or operation of each crosspoint in each stage can be accomplished sequentially or simultaneously depending on the type of system and the type of control circuit used. Electronic scanners shown as items 101 through 109 may be used to selectively extend the marking potentials to the bases of transistors of appropriate drivers.

The communication path between inlet IN5 and the terminating circuit TC541 will include matrix card A1 in the A stage, matrix card B10 in the B stage and matrix card C55 in the C stage. The crosspoints involved in said path will include crosspoint CP5/10 of matrix card A1, CP1/1 of matrix card B10 and crosspoint CP1/1 of matrix card C55. These crosspoints have been abstracted and shown in more detail in FIG. 4. To complete the required path through these crosspoints the following circuits will be involved. Since the inlet IN5 is connected to the horizontal multiple H5 and the outlet having access to the B stage card B10 is vertical multiple V10, crosspoint CP5/10 will be operated. To operate the crosspoint relay in a manner described with reference to FIG. 1, the transistor in the inlet driver DA5 will be turned on supplying a voltage to one side of the relay crosspoint. The matrix driver MA1 will be supplied with a train of pulses with a 50 percent duty cycle, from a source such as pulse source 110, and the outlet driver ODA10 will be supplied with a train of pulses with a 50 percent duty cycle inverse to the train of pulses supplied to the matrix select circuit MA1. The current flowing through the winding of the relay builds up and the relay operates as described in reference to FIG. 1. The connections through the B stage are extended upon operation of the relay at crosspoint CP1/1. To operate a relay in the B card, the inlet driver DB1, the matrix driver MB10 and the outlet driver ODB1 are used and the crosspoint relay is operated as described in operating crosspoint CP5/10 in the A stage. To extend the path through the C stage the operation to a crosspoint CP1/1 in a matrix card C55 is required. Inlet driver DC1, matrix driver MC55 and the outlet driver ODC1 perform the marking of crosspoint CP1/1 in the manner as described for the A stage. After the relay crosspoints in all the stages have been operated, closing their associated contacts, a holding potential is extended via the H lead from the inlet circuit through the crosspoint network to the terminating circuit and the marking or operating potential from the relays can be disconnected.

While the principles of the invention have been described in connection with a specific apparatus, it is to be understood that this description is by way of example and is not intended as a limitation of the scope of the invention except as such limitations appear in the appended claims.

What is claimed is:

1. In a crosspoint switching system having a plurality of co-ordinate matrices, each matrix including a plurality of inlet multiples and a plurality of outlet multiples, and a plurality of relays each having an operate winding and a unidirectionally conductive device connected in series between an inlet and an outlet multiple and defining a crosspoint, a crosspoint marking arrangement comprising:

means to apply a first marking potential to a selected one of said inlet multiples of each of said plurality of matrices;

means to apply a second marking potential consisting of a first train of pulses to a selected one of said outlet multiples of each of said plurality of matrices; and means to apply a third marking potential consisting of a second train of pulses occurring at times alternating with the pulses of said first pulse train to all said outlet multiples of a particular matrix of said plurality of matrices;

means causing said first, second and third marking potentials to co-act to supply current which energizes a particular crosspoint relay in said switching system.

2. A crosspoint marking arrangement according to claim 1, wherein said means to apply a first marking potential comprises:

a plurality of inlet marking leads each connected to one of said plurality of inlet multiples in each of said plurality of matrices; and a plurality of transistors; each transistor including a base, an emitter and a collector, each of said plurality of transistors having its collector connected to the associated inlet marking lead and its emitter connector to a first marking potential source.

and a control circuit operative to apply a signal to the base of a selected transistor to thereby extend said first marking potential via its associated inlet marking lead to the inlet multiples connected to said inlet marking lead of all said plurality of matrices.

3. A crosspoint marking arrangement according to claim 2, wherein said means to apply a second marking potential comprises:

a plurality of outlet marking leads each connected to one of said plurality of outlet multiples in each of said plurality of matrices;

a unidirectional conductive device interposed between each outlet multiple and its associated outlet marking lead; and a plurality of transistors each including a base, an emitter and a collector, each said transistor having its collector connected to an associated outlet marking lead and its emitter connected to a second marking potential, said control circuit being operative to apply a train of pulses to the base of a selected transistor to thereby turn said selected transistor ON and OFF alternately, said transistor during the time it is ON supplying said second marking potential via its associated outlet marking lead to the outlet multiples connected to said outlet marking lead.

4. A crosspoint marking arrangement as claimed in claim 3, wherein each transistor in said means to apply a second marking potential includes a Zener voltage clamping source connected to the collectors of each of said transistors, said Zener voltage clamping source causing the current to decay to zero during the period the transistor of said second potential supplying means is turned OFF.

5. A crosspoint marking arrangement as claimed in claim 4 wherein said means to apply a third marking potential comprises:

a select-matrix circuit including a plurality of transistors and a plurality of unidirectional conductive devices, one of said plurality of transistors being associated with one of said plurality of matrices and connected to all outlet multiples of that particular matrix at said transistor's collector through series connected unidirectional conductive devices, the emitter of said transistor being connected to a third marking potential, said control circuit being operative to apply a train of pulses to the base of a selected transistor to thereby turn said transistor ON and OFF alternately thus applying said third potential during the time said transistor is ON via its series connected unidirectional device to all outlet multiples of the particular matrix, said selected transistor being turned ON when said second marking-potential-supplying transistor is OFF.

6. A crosspoint marking arrangement as claimed in claim 5, wherein each transistor in said means to apply a third marking potential includes a Zener voltage clamping source connected to the collectors of each of said transistors.

said Zener voltage clamping source causing the current too decay to zero during the period the transistor of said third potential applying means is turned OFF.

7. In a communication switching system operative to establish connections between a first set of terminals and a second set of terminals through a plurality of switching stages arranged in tandem between terminals of the first set and terminals of the second set, each of said stages having a plurality of relays arranged in co-ordinate matrices each relay including a hold winding with a normally open set of its own contacts connected in series with its hold winding, links interconnecting adjacent stages, each including a hold conductor interconnecting the series combination of the hold winding and normally open contacts of a relay in each of the adjacent stages, each relay also including an operate winding and a unidirectional conductive device connected in series with said winding, each matrix including a plurality of horizontal conductor multiples and a plurality of vertical conductor multiples having an operate winding and said unidirectional conductive device in series with said operate winding connected between said multiples, said matrices of each said stage, further having a plurality of inlet and a plurality of outlet marking leads, connected to said horizontal conductor multiples and said vertical conductor multiples, respectively, and extending from corresponding ones of said horizontal and said vertical conductor multiples to control circuit means for determining and selecting a particular crosspoint in each stage to establish a particular connection between said first and said second terminals, a crosspoint marking arrangement for each switching stage, comprising:

a select inlet circuit including a source of first potential and means to apply said first potential to a selected one of said horizontal conductor multiples of each of said plurality of matrices;

a select common outlet circuit including a source of second potential in the form of a train of pulses and means to apply said second potential at predetermined time periods to a selected one of said vertical conductor multiples of each of said plurality of matrices, the time periods of said second potential being sufficiently short so as not to allow a crosspoint relay which is marked in each matrix to be operated;

a matrix-select circuit including a source of third potential in the form of a train of pulses having the same periodicity but occurring at time periods alternate with that of the pulses of said second potnetial, and means to apply said third potential to all the vertical conductor multiples of the selected matrix, the time periods of said third potential being sufficiently short as not to allow crosspoint relays having said first potential and said third potential applied at their operate windings to be energized, said first, second and third potnetials co-acting to energize a particular crosspoint relay in said switching system to thereby extend a communication connection from said particular first terminal to a particular second terminal.

8. A system as claimed in claim 7, including holding means for completing, after operation of the relay in each stage, a holding connection for the operated relays extending over said hold conductor, said means including a source of holding potential of one polarity extending from said first set terminal to a source of holding potential of opposite polarity at said second set terminal.

References Cited

UNITED STATES PATENTS 3,349,189 10/1967 Van Bosse.

KATHLEEN H. CLAFFY, Primary Examiner

W. A. HELVESTINE, Assistant Examiner